(12) United States Patent
Irie et al.

(10) Patent No.: US 11,602,882 B2
(45) Date of Patent: Mar. 14, 2023

(54) STRAINING MECHANISM AND SCREW EXTRUDER INCLUDING STRAINING MECHANISM

(71) Applicant: NIHON SPINDLE MANUFACTURING CO., LTD., Hyogo (JP)

(72) Inventors: Makoto Irie, Hyogo (JP); Hiroyuki Fukuda, Hyogo (JP); Akio Koro, Hyogo (JP)

(73) Assignee: NIHON SPINDLE MANUFACTURING CO., LTD., Hyogo (JP)

(*) Notice: Subject to any disclaimer, the term of this patent is extended or adjusted under 35 U.S.C. 154(b) by 62 days.

(21) Appl. No.: 15/868,554

(22) Filed: Jan. 11, 2018

(65) Prior Publication Data
US 2018/0133947 A1 May 17, 2018

Related U.S. Application Data (63) Continuation of application No. PCT/JP2016/068468, filed on Jun. 22, 2016.

(30) Foreign Application Priority Data

Jul. 16, 2015 (JP) .............................. JP2015-142249

(51) Int. Cl.
*B29C 48/693* (2019.01)
*B29C 48/695* (2019.01)
(Continued)

(52) U.S. Cl.
CPC .......... *B29C 48/693* (2019.02); *B01F 27/722* (2022.01); *B01F 27/723* (2022.01);
(Continued)

(58) Field of Classification Search
CPC .................................................... B29C 48/693
See application file for complete search history.

(56) References Cited

U.S. PATENT DOCUMENTS

| 3,863,001 A | * | 1/1975 | Thumudo, Jr. ..... B29C 48/0022 264/148 |
| 4,257,901 A | * | 3/1981 | Rapp ..................... B29C 48/693 210/791 |

(Continued)

FOREIGN PATENT DOCUMENTS

| EP | 1 125 713 A2 | 8/2001 |
| GB | 2 014 897 A | 9/1979 |

(Continued)

OTHER PUBLICATIONS

Search report issued in European Application No. 16824226.1, dated Apr. 10, 2019.

(Continued)

*Primary Examiner* — Jason M Greene
*Assistant Examiner* — Eric J McCullough
(74) *Attorney, Agent, or Firm* — Michael Best & Friedrich LLP (57) ABSTRACT

There are provided a straining mechanism and a screw extruder including the straining mechanism, which can minimize material passing resistance in a breaker plate even, in a large-sized apparatus having high throughput, and which can improve the throughput by suppressing load power of the apparatus and heat generation of a material. For this purpose, a backup plate having an opening rate higher than an opening rate of a breaker plate and supporting the breaker plate is installed on a rear surface side of the breaker plate supporting a screen mesh.

18 Claims, 7 Drawing Sheets

(51) Int. Cl.
*B29C 48/69* (2019.01)
*B29C 48/265* (2019.01)
*B01F 27/722* (2022.01)
*B01F 27/723* (2022.01)
*B01F 35/00* (2022.01)
*B01F 101/00* (2022.01)

(52) U.S. Cl.
CPC ............ *B01F 35/188* (2022.01); *B01F 35/55* (2022.01); *B29C 48/265* (2019.02); *B29C 48/69* (2019.02); *B29C 48/695* (2019.02); *B01F 2101/2805* (2022.01)

(56) References Cited

U.S. PATENT DOCUMENTS

| | | | |
|---|---|---|---|
| 4,918,017 A | 4/1990 | Greenstreet et al. | |
| 5,507,498 A * | 4/1996 | Trott | B01D 29/05 277/300 |
| 5,756,129 A * | 5/1998 | Yoshii | B29C 48/694 425/185 |
| 2005/0046072 A1 * | 3/2005 | Shalkey | B28B 3/206 264/169 |

FOREIGN PATENT DOCUMENTS

| | | |
|---|---|---|
| JP | S54-117560 A | 9/1979 |
| JP | S56-168328 U1 | 12/1981 |
| JP | S57-151111 A | 9/1982 |
| JP | S60-6050 B2 * | 1/1985 |
| JP | H05-245906 A | 9/1993 |
| JP | 2000-355042 A | 12/2000 |
| JP | 2011-148188 A | 8/2011 |
| JP | 2014-018971 A | 2/2014 |

OTHER PUBLICATIONS

International Search Report issued in Application No. PCT/JP2016/068468, dated Jul. 26, 2016.

* cited by examiner

STRAINING MECHANISM AND SCREW EXTRUDER INCLUDING STRAINING MECHANISM

RELATED APPLICATIONS

Priority is claimed to Japanese Patent Application No. 2015-142249, filed Jul. 16, 2015, and International Patent Application No. PCT/JP2016/068468, the entire content of each of which is incorporated herein by reference.

BACKGROUND

Technical Field

Certain embodiments of the present invention relate to a straining mechanism and a screw extruder including the straining mechanism, and more particularly to a straining mechanism and a screw extruder including the straining mechanism, which can remove foreign substances such as impurities and undispersed particles (hereinafter, simply referred to as "foreign substances") mixed into high viscosity substances such as rubber and resin materials (hereinafter, referred to as "materials").

Description of Related Art

In the related art, in order to perform a straining process for removing the foreign substances contained in the materials, a straining mechanism having a screen mesh mounted on a discharge port of the materials is installed, and extruding work is carried out. In this manner, a screw extruder has been used in causing the screen mesh to remove the foreign substances contained in the materials.

Figure 7:
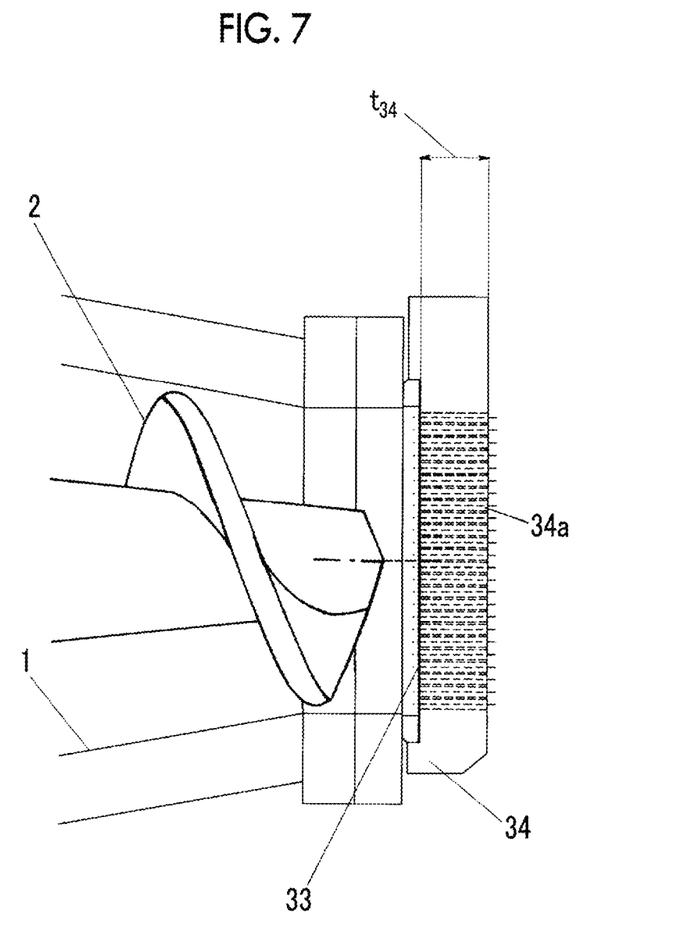
FIG. 7 is a view for describing a straining mechanism of a screw extruder in the related art.

Incidentally, for example, as illustrated in FIG. 7, the straining mechanism of the screw extruder adopts a configuration for preventing a screen mesh 33 from being widely opened and damaged due to strong pressure acting via the material when the material is extruded. For this purpose, a breaker plate 34 having an opening 34a including many small holes through which the material can pass is disposed on a rear surface of the screen mesh 33. In this manner, the breaker plate 34 supports the screen mesh 33.

SUMMARY

According to an embodiment of the present invention, there is, provided a straining mechanism including a screen mesh that is installed in a discharge port of a material, and a backup plate that has an opening rate higher than an opening rate of a breaker plate and supporting the breaker plate is installed on a rear surface side of the breaker plate supporting the screen mesh.

In this case, the breaker plate and the backup plate may be configured to serve as mutually different members.

In addition, the breaker plate and the backup plate may be configured to serve as a single member.

In addition, with respect to an area of a material flow path located immediately in front of the screen mesh the opening rate of the breaker plate is set to 30% to 60% and the opening rate of the backup plate is set to 60% to 85%.

In addition, all openings formed in the breaker plate may penetrate each side of openings formed in the backup plate.

In addition, there is provided a screw extruder including the above-described straining mechanism.

According to a straining mechanism and a screw extruder including the straining mechanism in the present invention, a backup plate having an opening rate higher than an opening rate of a breaker plate and supporting the breaker plate is installed on a rear surface side of the breaker plate supporting a screen mesh. Accordingly, material passing resistance which increases in consequence of increasing throughput (increased size of an apparatus) can be minimized by causing the backup plate installed on the rear surface side of the breaker plate and having the opening rate higher than the opening rate of the breaker plate to support the breaker plate. In this manner, a configuration can be adopted so that it is no longer necessary to increase a thickness of the breaker plate in order to ensure strength. Accordingly, even in a large-sized apparatus having high throughput, it is possible to minimize the material passing resistance in the breaker plate, and it is possible to improve the throughput by suppressing load power of the apparatus and heat generation of a material.

In addition, the breaker plate and the backup plate are configured to respectively include different members. In this manner, the breaker plate and the backup plate can be independently and easily manufactured.

In addition, the breaker plate and the backup plate are configured to include a single member. In this manner, overall strength of the breaker plate and the backup plate can be improved.

In addition, the opening rates are respectively set so that the opening rate of the breaker plate with respect to an area of a material flow path located immediately in front of the screen mesh is 30% to 60% and the opening rate of the backup plate is 60% to 85%. In this manner, while the material passing resistance in the breaker plate is minimized, overall strength of the breaker plate and the backup plate can be improved.

In addition, all openings formed in the breaker plate penetrate each side of openings formed in the backup plate. In this manner, the breaker plate is prevented from being clogged, thereby enabling simplified maintenance for the apparatus.

BRIEF DESCRIPTION OF THE DRAWINGS

FIGS. 1A and 1B illustrate an embodiment of a screw extruder including a straining mechanism according to the present invention.

FIGS. 3A to 3C illustrate a first embodiment of the straining mechanism of the screw extruder.

FIGS. 4A to 4C illustrate a second embodiment of the straining mechanism of the screw extruder.

FIGS. 5A to 5C illustrate a third embodiment of the straining mechanism of the screw extruder.

5C is a sectional view corresponding to a sectional view taken along line C-C in FIG. 2.

DETAILED DESCRIPTION

However, according to a straining mechanism 3 of the screw extruder in the related art, in consequence of increasing throughput (increased size of an apparatus), resistance increases when the material passes through the breaker plate 34 (hereinafter, referred to as "material passing resistance"). Consequently, pressure needed to extrude the material increases, and load power of the apparatus increases, thereby causing heat generation to increase in the material.

In addition, if the pressure needed to extrude the material increases, a rate of the material leaking from a clearance between a screw 2 and a casing 1 of the screw extruder increases, thereby decreasing the throughput. In particular, in a dual shaft screw extruder, the material leaks not only from the clearance between the screw 2 and the casing 1 but also from between the screws 2. Furthermore, both the screws 2 mesh with each other, thereby distributing pressure inside the casing. In this way, deflection occurs due to bending force applied to the screw 2. Accordingly, it is necessary to increase the clearance between the screw 2 and the casing 1. Consequently, the throughput significantly decreases.

Therefore, it is necessary to increase a thickness $t_{34}$ of the breaker plate 34 in order to ensure strength against the material passing resistance which increases in consequence of the increasing throughput (increased size of an apparatus). However, if the thickness $t_{34}$ of the breaker plate 34 increases, the material passing resistance increases, thereby causing the throughput to decrease.

In addition, if the thickness $t_{34}$ of the breaker plate 34 varies depending on a size of the apparatus, efficiency in obtaining the amount of extruding the material varies. Consequently, it is less likely to assume satisfactory throughput achieved by scaling up a small-sized apparatus.

The present inventors have recognized that there is need for providing a straining mechanism and a screw extruder including the straining mechanism, which can minimize material passing resistance in a breaker plate, even in a large-sized apparatus having high throughput, and which can improve throughput by suppressing load power of an apparatus and heat generation of a material.

Hereinafter, embodiments of a straining mechanism and a screw extruder including the straining mechanism according to the present invention will be described with reference to the drawings.

FIGS. 1A to 3C illustrate an embodiment of the screw extruder including the straining mechanism according to the present invention.

Figures 1A, 1B:
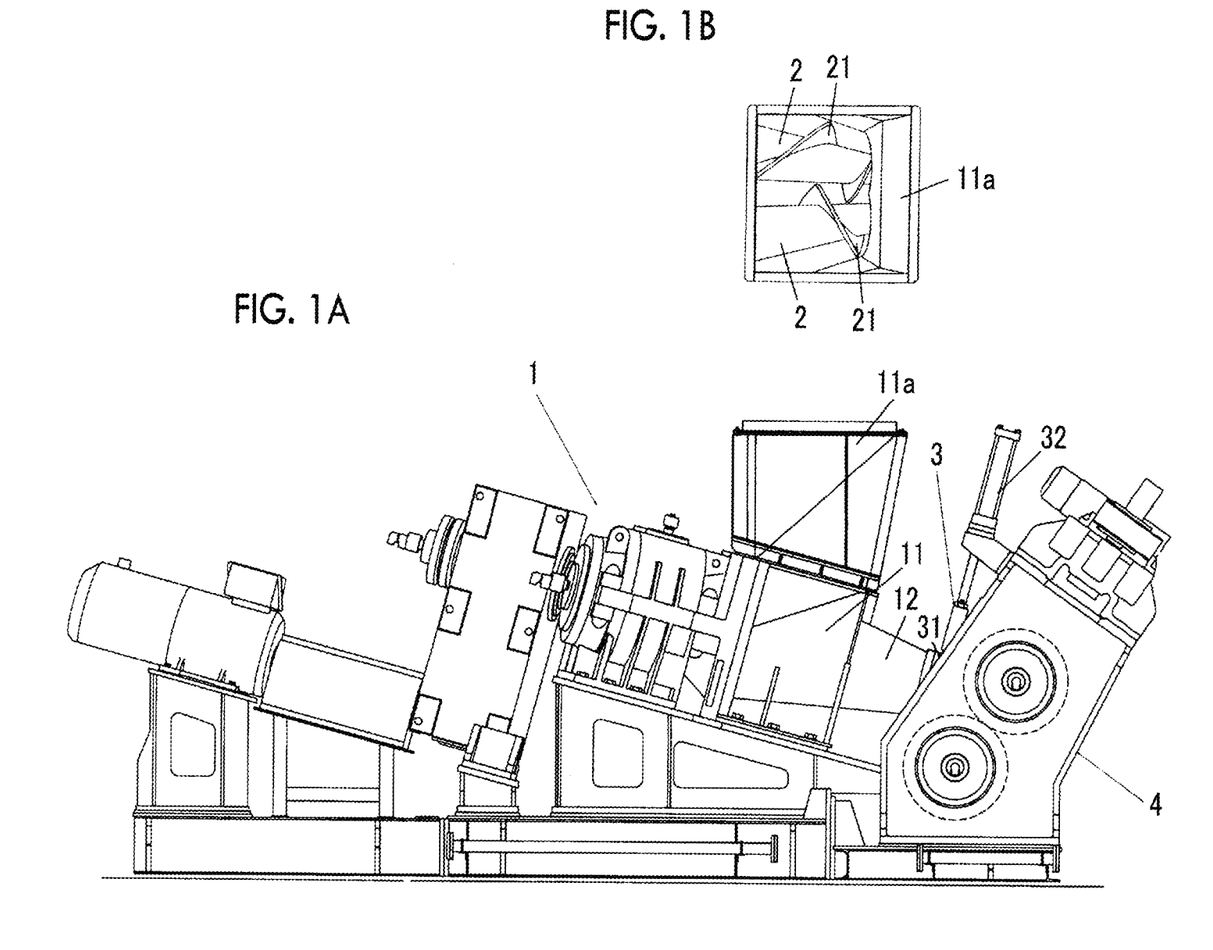
FIG. 1A is a general view.
FIG. 1B is a plan view of a hopper portion.

The screw extruder is configured as follows. A dual shaft screw 2 in which a screw blade 21 having a tapered shape is installed is disposed so as to be rotatable inside a casing 1 including a tapered cylindrical hopper portion 11 in which a material loading port 11a is formed as a feeder portion, and a tapered cylindrical compression portion 12 in which a material discharge port 12a is formed in a distal end subsequently to the hopper portion 11.

Then, in the screw extruder, a straining mechanism 3 is disposed on a downstream side in a material flowing direction of the feeder portion, and a dual shaft roll 4 is disposed on the downstream side, respectively. In this manner, the screw extruder can continuously perform material straining and sheet-like molding.

Figure 2:
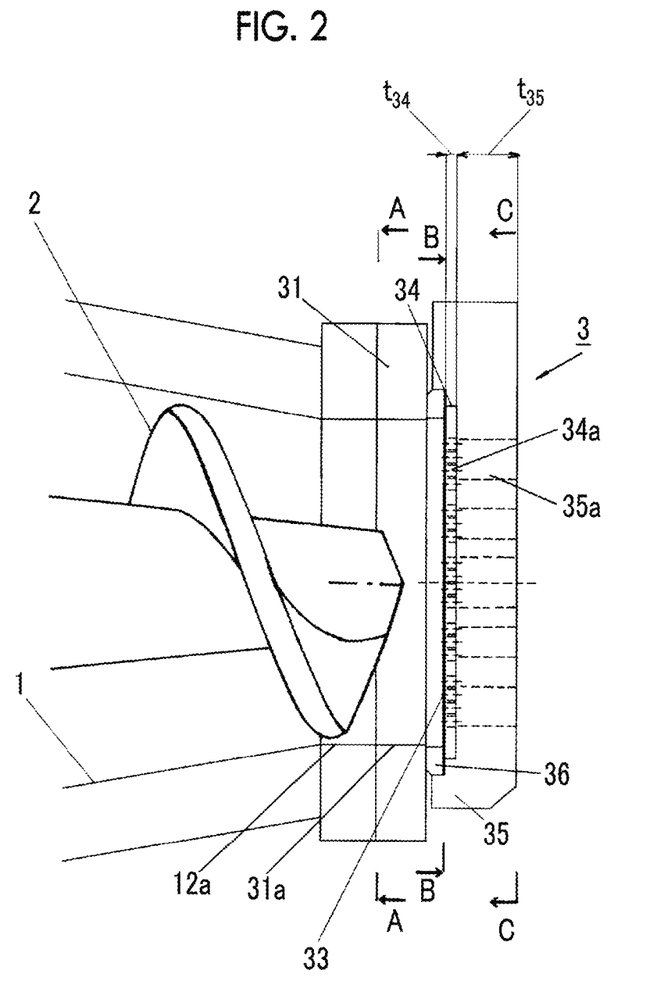
FIG. 2 is a view for describing the straining mechanism of the screw extruder.

Incidentally, the straining mechanism 3 is configured to include a connection member 31 forming a material flow path 31a connected to the discharge port 12a of the casing 1, a screen mesh 33 which is installed so as to be slidable in a vertical direction along the discharge port 12a by using a slide mechanism 32 having a cylinder, more specifically, which is installed so as to traverse the material flow path 31a connected to the discharge port 12a, a breaker plate 34, and a backup plate 35.

Here, the screen mesh 33 is installed in order to remove foreign substances contained in the material, and can be used depending on properties of the material or removal target foreign substances.

Figure 3A:
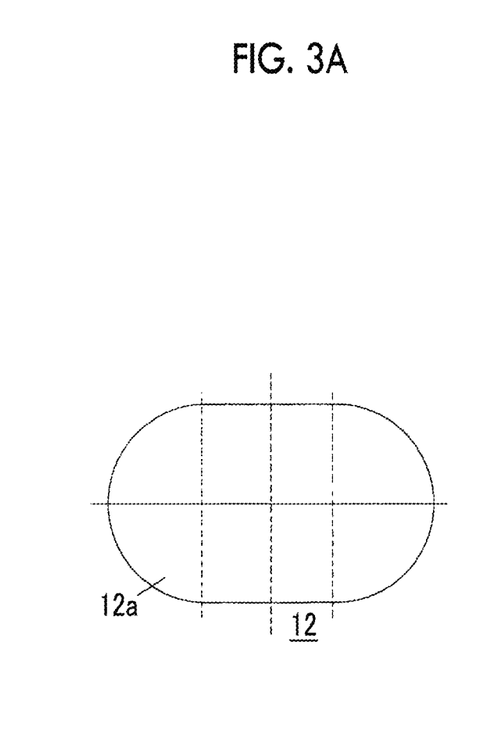
FIG. 3A is a sectional view corresponding to a sectional view taken along line A-A in FIG. 2.

In addition, the breaker plate 34 supports the screen mesh 33 by being disposed on a rear surface of the screen mesh 33, thereby forming openings 34a having many small holes through which the material can pass. The opening 34a having the small holes preferably has a hole diameter of approximately φ 5 to 15. In compliance with a shape of the discharge port 12a having an oval shape formed for the screw extruder including the dual shaft screw 2, it is preferable to form the respective openings 34a so as to be located at zigzag positions.

A thickness $t_{34}$ of the breaker plate 34 is set to approximately 5 to 20 mm.

In addition, the backup plate 35 supports the breaker plate 34 by being disposed on a rear surface of the breaker plate 34, thereby forming a large opening 35a through which the material can pass. Accordingly, the backup plate 35 has an opening rate higher than an opening rate of the breaker plate 34.

Figure 3B:
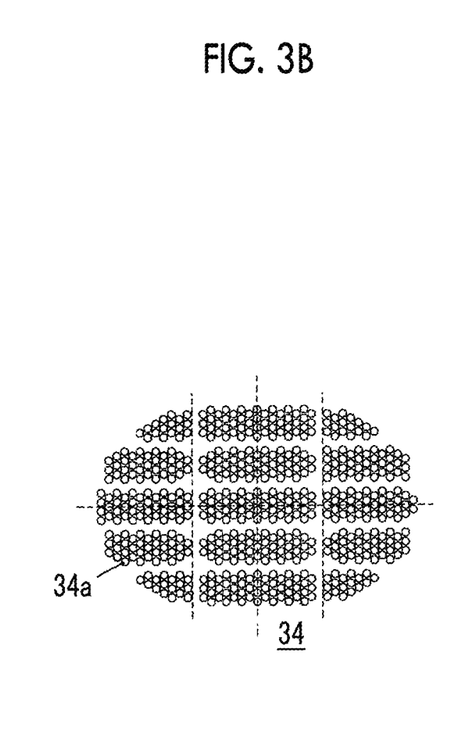
FIG. 3B is a sectional view corresponding to a sectional view taken along line B-B in FIG. 2.

The large opening 35a is formed after being divided by a lattice 35b in compliance with a shape of the discharge port 12a having an oval shape formed for the screw extruder including the dual shaft screw 2.

In accordance with required strength, a thickness t35 of the backup plate 35 is set to approximately 20 to 80 mm, and is preferably set to approximately 30 to 70 mm.

Figure 3C:
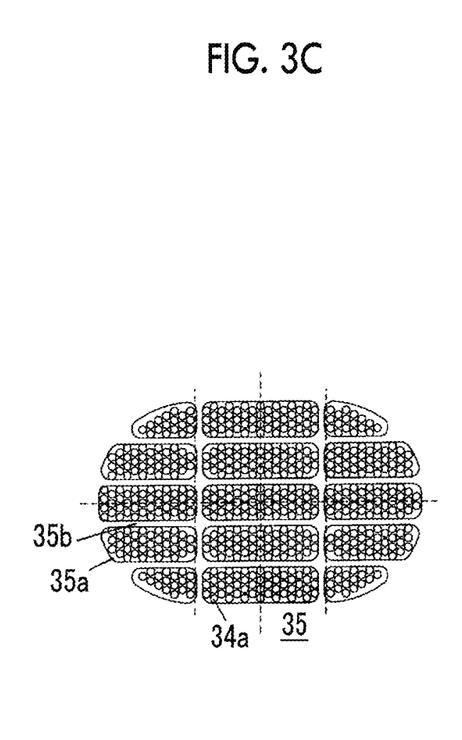
FIG. 3C is a sectional view corresponding to a sectional view taken along line C-C in FIG. 2.
Figure 4A:
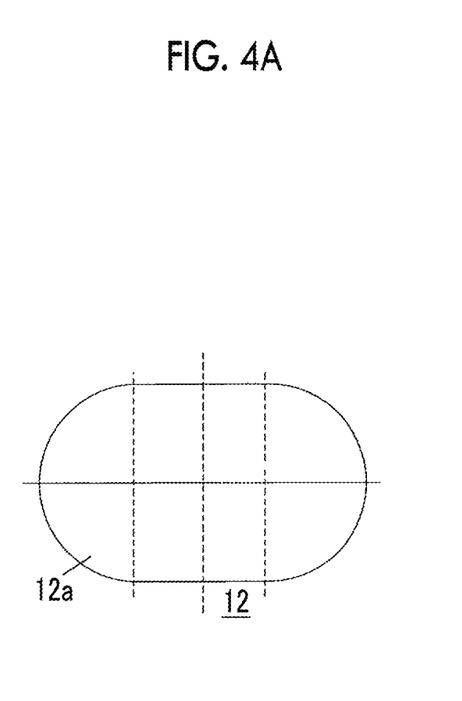
FIG. 4A is a sectional view corresponding to a sectional view taken along line A-A in FIG. 2.
Figure 4B:
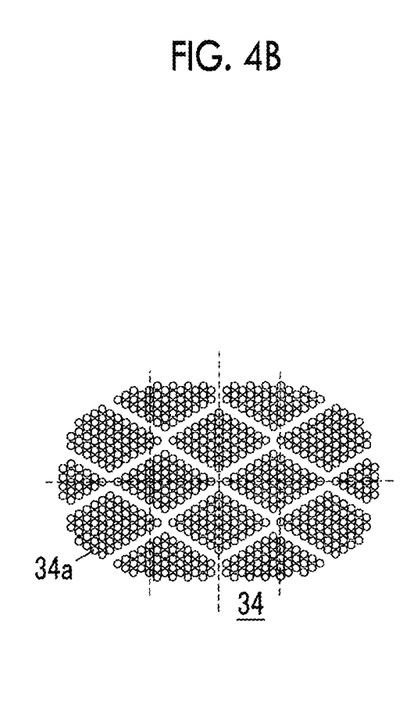
FIG. 4B is a sectional view corresponding to a sectional view taken along line B-B in FIG. 2.
Figure 4C:
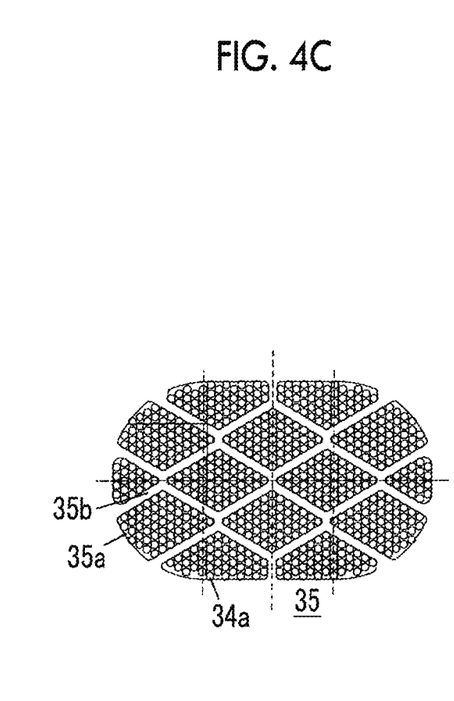
FIG. 4C is a sectional view corresponding to a sectional view taken along line C-C in FIG. 2.

Incidentally, in addition to a square (rectangular) lattice shape as illustrated in the first embodiment of FIG. 3, the lattice 35b which divides and forms the opening 35a of the backup plate 35 can employ a rhombic lattice shape as illustrated in a second embodiment of FIG. 4.

In this way, the lattice 35b is formed in the rhombic lattice shape, in particular, the lattice 35b which divides and forms the adjacent opening 35a is disposed so that sides of the lattice 35b are not located on a straight line. In this manner, the lattice 35b is supported while stress is dispersed without being concentrated on a lattice point. Accordingly, bearing force for supporting the backup plate 35 can be improved.

Figure 5A:
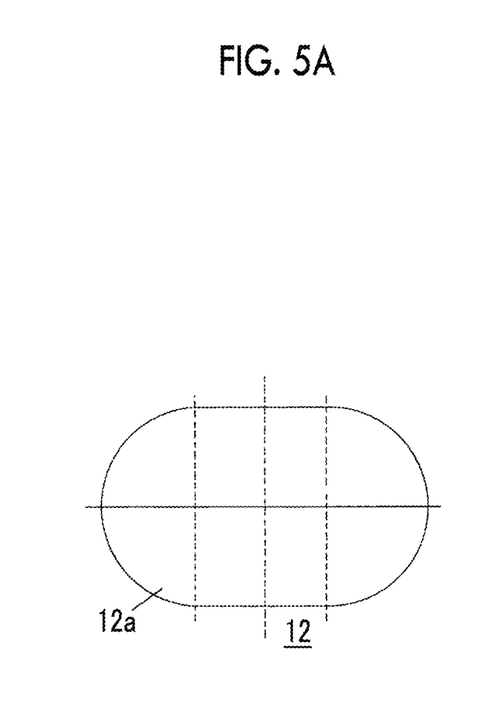
FIG. 5A is a sectional view corresponding to a sectional view taken along line A-A in FIG. 2.
Figure 5B:
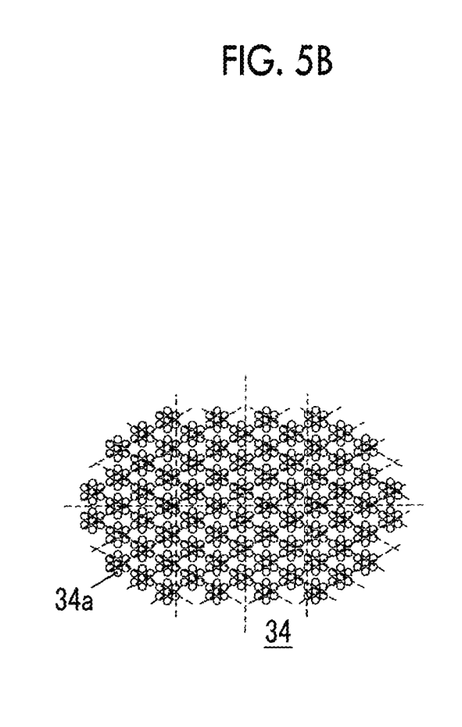
FIG. 5B is a sectional view corresponding to a sectional view taken along line B-B in FIG. 2. FIG.
Figure 5C:
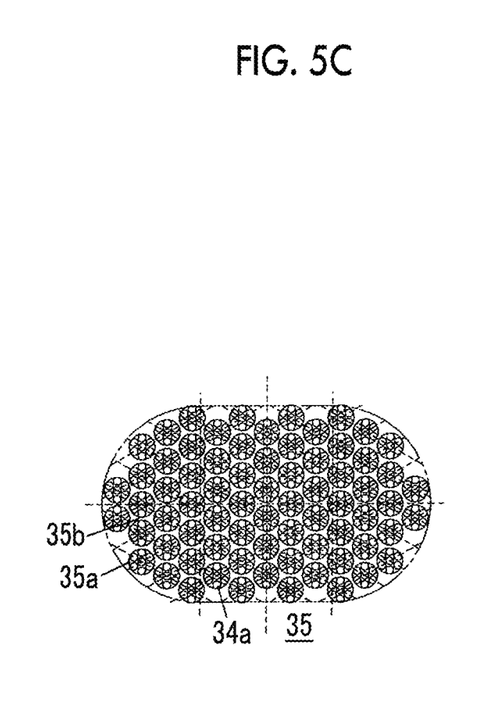

In addition, the lattice 35b which divides and forms the opening 35a of the backup plate 35 can employ a lattice shape in which the openings 35a having a circular shape are disposed at zigzag positions as illustrated in a third embodiment in FIG. 5.

Even in a case of employing the lattice shape, the lattice 35b is supported while the stress is dispersed without being concentrated on the lattice point. Accordingly, bearing force for supporting the backup plate 35 can be improved.

Here, with respect to an area of the material flow path located immediately in front of the screen mesh 33 (in the present embodiment in which the material flow path 31a formed in the connection member 31 connected to the discharge port 12a of the casing 1 includes a material flow path having a constant straight area, the area of the material flow path 31a is the same as the area of the discharge port 12a of the casing 1. As in a fourth embodiment illustrated in FIG. 6, in a case where the material flow path 31a includes a material flow path in which a tapered area expands, an area of the expanding portion), the opening rates are respectively set so that the opening rate of the breaker plate 34 is approximately 30% to 60% and the opening rate of the backup plate 35 is approximately 60% to 85&%.

Figure 6:
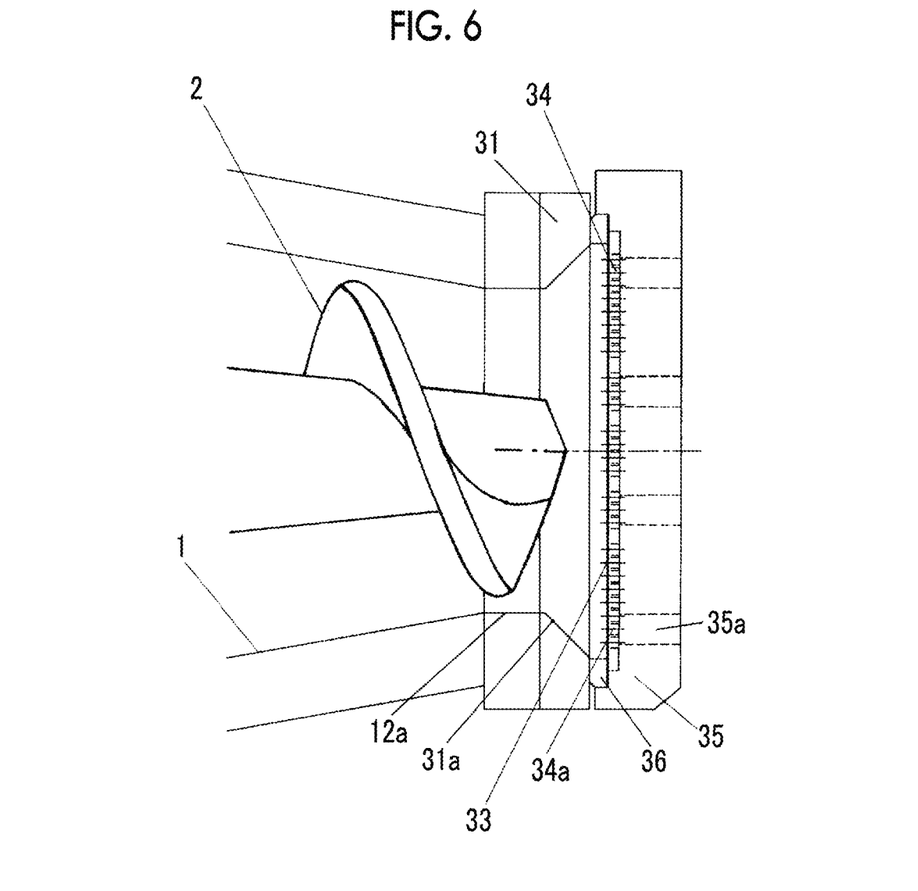
FIG. 6 is a view for describing a fourth embodiment of the straining mechanism of the screw extruder.

In this manner, while the material passing resistance is minimized in the breaker plate 34, the overall strength of the breaker plate 34 and the backup plate 35 can be improved.

Table 1 illustrates the opening rate of the breaker plate 34 and the opening rate of the backup plate 35 with respect to the area of the material flow path located immediately in front of the screen mesh 33 according to the first to third embodiments.

TABLE 1

| | Opening rate (%) of breakerplate 34 with respect to area of material flow path located immediately in front of screwmesh 33 | Opening rate (%) of backup plate 35 with respect to area of material flow path located immediately in front of screwmesh 33 |
|---|---|---|
| First Embodiment | 44 | 75 |
| Second Embodiment | 49 | 77 |
| Third Embodiment | 36 | 69 |

In addition, the screen mesh 33 and the breaker plate 34 are fitted into recesses formed in the backup plate 35, and are mounted on the backup plate 35 by using any desired fixer means such as holding rings and screws.

In this manner, when the apparatus is operated or when the screen mesh 33 is replaced it is possible to prevent the screen mesh 33 from being damaged or misaligned with the breaker plate 34.

In addition, specifically, a sealing member 36 is disposed in the straining mechanism 3 in order to prevent leakage of the material from a gap between the connection member 31 connected to the discharge port 12a of the casing 1 and the backup plate 35.

Incidentally, according to the present embodiment, the breaker plate 34 and the backup plate 35 are configured to respectively include different members so that the breaker plate 34 and the backup plate 35 can be independently and easily manufactured. However, for example, the breaker plate 34 and the backup plate 35 can be configured to include a single member.

In this manner, the overall strength of the breaker plate 34 and the backup plate 35 can be improved.

In addition, all of the openings 34a formed in the breaker plate 34 can penetrate each side of the openings 35a formed in the backup plate 35.

In this manner, the material remaining in the breaker plate 34 can be prevented from being mixed into a material to be subsequently extruded, and maintenance for the apparatus can be simplified.

In addition, the backup plate 35 on which the screen mesh 33 and the breaker plate 34 are mounted is installed so as to be slidable in the vertical direction along the discharge port 12a by using the slide mechanism 32 having a cylinder. In this manner, the screen mesh 33 can be easily replaced. However, a direction in which the backup plate 35 is slidable by using the slide mechanism 32 can be set to the horizontal direction, and the sliding operation can be manually performed.

According to the straining mechanism having the above-described configuration and the screw extruder including the straining mechanism, the following operations and effects can be achieved.

(1) The strength against extrusion pressure of the material is ensured by the backup plate 35. Accordingly, the thickness $t_{34}$ of the breaker plate 34 can be reduced so as to reduce the material passing resistance. The pressure required for extruding the material is reduced, and the load power of the apparatus is reduced, thereby minimizing the heat generation of the material. In this manner, the material is not deteriorated due to temperature rise. Therefore, the present invention can contribute to improved quality.

(2) The opening 34a and 35a are not disposed in the place where the backup plate 35 is in contact with and supports the breaker plate 34, the opening area (opening rate) decreases. However, the material passing resistance decreases, thereby increasing the throughput.

(3) In a case where the size of the apparatus increases and the further ensured strength is required, without increasing the thickness $t_{34}$ of the breaker plate 34, the thickness of the backup plate 35 having the small material passing resistance is increased so as to ensure the strength. In this manner, it is possible to minimize a decrease in the throughput.

(4) The material passing resistance depending on the size of the apparatus varies little. Accordingly, it is likely to assume satisfactory throughput achieved by scaling up a small-sized apparatus.

Hitherto, the straining mechanism and the screw extruder including the straining mechanism according to the present invention have been described with reference to the embodiments of the screw extruder including the dual shaft screw 2 having the tapered screw blade 21 installed therein. However, the present invention is not limited to the configurations described in the above embodiments. For example, the present invention is applicable to a screw extruder including a dual shaft screw having a straight screw blade installed therein, or a screw extruder including a single shaft screw. Furthermore, the present invention is applicable to extruders other than the screw extruder. The configurations according to the present invention can be appropriately modified within the scope not departing from the gist of the invention.

The straining mechanism and the screw extruder including the straining mechanism according to the present invention can minimize the material passing resistance in the breaker plate, even in a large-sized apparatus having high throughput, and can improve the throughput by suppressing the load power of the apparatus and the heat generation of the material. Accordingly, the present invention can be suitably used for the straining mechanism used for removing the foreign substances contained in the material and the screw extruder including the straining mechanism. Furthermore, the present invention is applicable to extruders other than the screw extruder.

It should be understood that the invention is not limited to the above-described embodiment, but may be modified into various forms on the basis of the spirit of the invention. Additionally, the modifications are included in the scope of the invention.

What is claimed is:

1. A straining mechanism comprising:
a screen mesh configured to remove a foreign substance from material when the material passes through the screen mesh to a surface of the screen mesh;
a breaker plate affixed to the surface of the screen mesh, breaker plate holes through the breaker plate are configured to pass the material from the surface of the screen mesh to a surface of the breaker plate; and
a backup plate affixed to the surface of the breaker plate, backup plate holes through the backup plate are configured to pass the material from the surface of the breaker plate to a surface of the backup plate,
wherein the breaker plate holes are between the backup plate holes and screen mesh,
one of the backup plate holes extends to two or more of the breaker plate holes,
the two or more of the breaker plate holes extend from the screen mesh to the one of the backup plate holes, and
the screen mesh is between a dual shaft screw and the breaker plate holes.

2. The straining mechanism according to claim 1, wherein the backup plate holes are between the breaker plate holes and a discharge port, the discharge port has an oval shape.

3. The straining mechanism according to claim 1, wherein the screen mesh and the breaker plate are fitted into a concaved portion of the backup plate.

4. The straining mechanism according to claim 1, further comprising:
a fixer configured to affix, onto the backup plate, the screen mesh and the breaker plate.

5. The straining mechanism according to claim 1, wherein the two or more of the breaker plate holes fluidly communicate with the one of the backup plate holes.

6. The straining mechanism according to claim 1, wherein an additional one of the backup plate holes extends to an additional two or more of the breaker plate holes.

7. The straining mechanism according to claim 6, wherein the additional two or more of the breaker plate holes extends from the screen mesh to the additional one of the backup plate holes.

8. The straining mechanism according to claim 1, wherein the breaker plate holes extend from the screen mesh to the surface of the breaker plate.

9. The straining mechanism according to claim 1, wherein the backup plate holes extend from the breaker plate holes to the surface of the backup plate.

10. The straining mechanism according to claim 1, wherein the screen mesh and the breaker plate are mounted onto the backup plate.

11. The straining mechanism according to claim 1, wherein one of the backup plate holes, in a sectional view of the straining mechanism, surrounds two or more of the breaker plate holes.

12. The straining mechanism according to claim 11, wherein each of the backup plate holes, in the sectional view of the straining mechanism, is larger than any of the breaker plate holes.

13. The straining mechanism according to claim 1, further comprising:
a slide mechanism configured to slide the screen mesh in a manner that permits replacement of the screen mesh.

14. The straining mechanism according to claim 13, wherein the slide mechanism is configured to slide the backup plate.

15. The straining mechanism according to claim 1, wherein a porosity of the backup plate is higher than a porosity of the breaker plate.

16. The straining mechanism according to claim 15, wherein with respect to an area of a material flow path located immediately in front of the screen mesh, the porosity of the breaker plate is 30% to 60%.

17. The straining mechanism according to claim 15, wherein with respect to an area of a material flow path located immediately in front of the screen mesh, the porosity of the backup plate is 60% to 85%.

18. A screw extruder comprising:
the straining mechanism according to claim 1.

* * * * *